Nov. 4, 1969  C. D. CRICKMER  3,475,798
POLISH ROD GRIP CLAMP
Filed Dec. 8, 1967
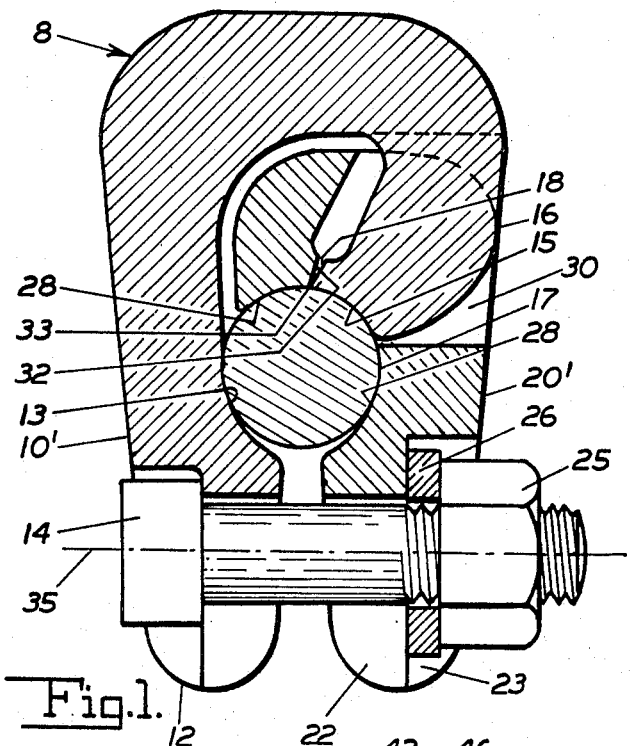
Fig.1.
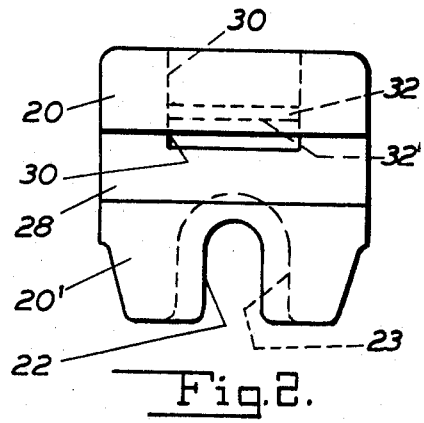
Fig.2.
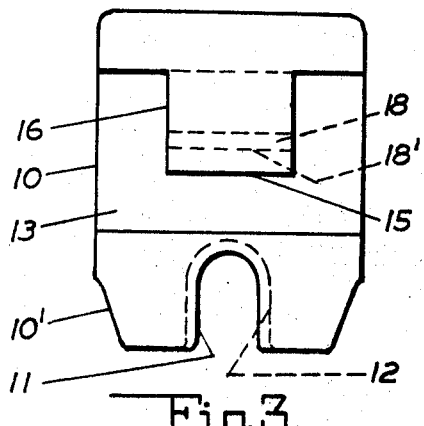
Fig.3.
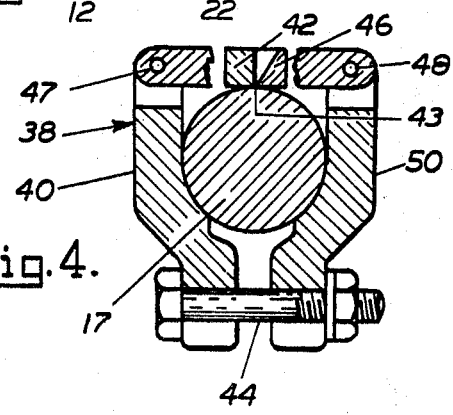
Fig.4.
Fig.5.
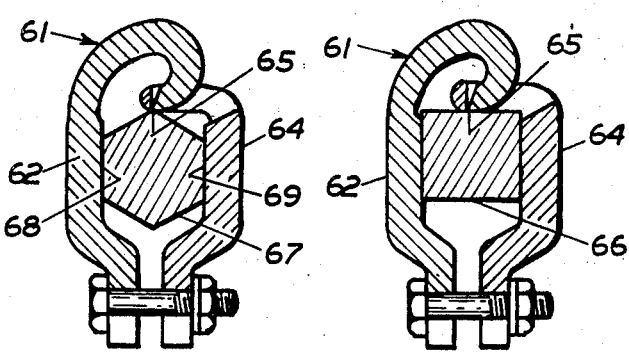
Fig.6.   Fig.7.
INVENTOR.
CHARLES D. CRICKMER.

United States Patent Office 3,475,798
Patented Nov. 4, 1969

3,475,798
POLISH ROD GRIP CLAMP
Charles D. Crickmer, 12923 Memorial Drive,
Houston, Tex. 77024
Filed Dec. 8, 1967, Ser. No. 689,172
Int. Cl. F16b 2/10
U.S. Cl. 24—249      10 Claims

ABSTRACT OF THE DISCLOSURE

A grip clamp to be used on the polished surface of an elongated member comprising two interfitting clamp members engageable along a fulcrum line at or very near the surface on one side of the elongated member to provide maximum friction force on the polished surface for a given clamping force applied to portions of the clamp members extending beyond the other side of the elongated member.

---

In the fields of mechanical manipulation such as oil well pumping, for example, it is often desirable to use a grip clamp to apply substantially axial forces to an elongated member having a smooth surface, which surface must not be scarred or roughened as by the use of toothed clamping members, with the result that a purely frictional engagement between smooth surfaces of the grip clamp and of the elongated member, respectively, must be developed. Such a frictional engagement is primarily dependent upon the amount of force with which the two surfaces are pressed together since no toothed engagement is allowed.

Clamps of the prior art normally used for such purposes have in general met the need but have been subject to the objection that the amount of friction force applied to the polished surface was severely limited by the low mechanical advantage inherent in the clamp design commonly employed. Because clamps of earlier design comprised a pair of clamp members pivotally secured together by a pin at a substantial distance from the polished surface on one side of the cylindrical member the application of clamping force by the use of a bolt applied to the two clamp members at approximately the same distance on the other side of the cylindrical member gave a mechanical advantage of approximately two to one.

The principles of the instant invention provide for two interfitting clamp members having a fulcrum line at or very near the surface of the elongated member with the usual clamp bolt forcing the two clamp members towards each other at a substantial distance at the opposite side of the elongated member so that a mechanical advantage of more than three to one is attainable.

With such high mechanical advantage greater friction force between the clamp and the smooth surface is possible with attendant advantages obvious to those of skill in the mechanical arts.

The advantages inherent in the grip clamp on this invention will become more apparent upon consideration of the following description and drawings in which:

FIG. 1 is a median section view of a grip clamp incorporating features of this invention;

FIG. 2 is a smaller scale side elevation of one element of the clamp shown in FIG. 1;

FIG. 3 is a side elevational view of another element of the clamp of FIG. 1 on the same scale as FIG. 2;

FIG. 4 is a sectional view of a second embodiment of the clamp of this invention;

FIG. 5 is a sectional view of third embodiment of the clamp of this invention;

FIG. 6 is a sectional view of a fourth embodiment of the rod clamp of this invention applied to a hexagonal rod;

FIG. 7 is a sectional view of the embodiment of FIG. 6 applied to a square rod.

In FIGS. 1, 2 and 3 there is shown one embodiment of this invention wherein a grip clamp, generally indicated at 8, comprises a left-hand clamp member 10 of generally rectangular outline having a hooked shaped cross section with a downwardly extending leg portion 10' having a centrally located upwardly extending open notch 11 therein in the shape of an inverted U and having an enlarged portion 12 so that when the notch 11 receives the body portion of a clamp bolt 14 the enlarged portion will slidably receive the head of the clamp bolt 14 in a well known manner. The leg portion 10' has an inwardly facing arcuate surface 13 spaced from but not diametrically opposed to a second arcuate surface 15 formed on the lower portion of a generally rectangular downwardly extending tongue member 16 (see FIG. 3). Arcuate surfaces 13 and 15 have substantially equal radii from a common center and are suitably curved to engage portions of the surface of an elongated cylindrical member such as a polished rod 17 inserted between the surfaces 13 and 15 and are spaced apart to allow interposition of another portion of grip clamp 8 hereinafter described. The arcuate surface 15 terminates leftwardly at a substantially flat approximately radially disposed surface 18 (see FIG. 3) extending outwardly from the outer surface of the polished rod 17.

A right-hand clamp member 20 of generally rectangular outline having an inverted L shaped cross section has a downwardly depending leg portion 20' providtd with an inverted U shaped notch 22 similar to notch 11 and having an enlarged portion 23 to receive a nut and lock washer 25 and 26, respectively, threadedly engaged with the clamp bolt 14 in a well known manner. The upper inner portion of the right-hand clamp member 20 has an extensive arcuate surface portion 28 formed to engage the outer surface of the polished rod 17 through nearly one-half its circumference excepting only that the surface 28 is interrupted by a rectangular opening 30 extending through the central portion of the right-hand clamp member 20. Opening 30 is of a size to slidably receive the tongue portion 16 of the left-hand clamp member 10 with the surface of the opening 30 facing to the right as seen in FIG. 1 forming an approximately radial surface 32 beginning at the surface of the polished rod 17 and extending outwardly therefrom through the upper surface of the right-hand clamp member 20. It is to be noted that the nearly radial surfaces 18 and 32 have an angular relationship such that the only points of contact between these opposed surfaces are along a line 33 at, very near or closely adjacent the surface of the polished rod 17 with the surfaces 18 and 32 diverging outwardly from the polished rod surface to the extent necessary that the surfaces 18 and 32 continue to engage in approximately single line contact until the leg portion 10' and the leg potrion 20' come into abutting engagement. The line of engagement between the surfaces 18 and 32, hereinafter referred to as the fulcrum line 33 for the two clamp members 10 and 20 is formed by the lower edges of the two surfaces 18 and 32 as indicated at 18' and 32' on FIGS. 3 and 2, respectively.

It is to be noted that if the arcuate surfaces 13 and 15 of clamp member 10 are so placed that they overlap the ends of a common diameter the clamp is still operable but must be stripped on the polished rod 17 rather than applied transversely as hereinafter described.

One mode of operating the clamp of this invention as shown in the embodiment of FIGS. 1, 2 and 3 is as follows:

The left-hand clamp member 10 is held in the position shown in FIG. 1 with the right-hand clamp member 20 rotated 90° to the left from its position shown in FIG. 2 and with its leg portion 20' swung out to the right in an almost horizontal position, the opening 30 can be hooked over the tongue portion 16 and being pushed upward will bring the surfaces 18 and 32 into approximate contact. A slight rotation of the right-hand clamp member 20 downwardly or to the left as seen in FIG. 1 will leave the leg portions 10' and 20' far enough apart for the clamp to be dropped over a rod with the left-hand clamp member 10 in the desired position shown in FIG. 1. Further rotation of the right-hand clamp member 20 to the left will bring it into approximately the position shown in FIG. 1;

The clamp bolt 14 is next slidably inserted upwardly through the notches 11 and 22 with the nut 25 and the lock washer 26 loosely engaged with the end portion of the clamp bolt 14 until the clamp bolt 14 has been positioned in the notches 11 and 22;

Upon tightening the nut 25 the leg portions 10' and 20' are biased towards each other with the desired amount of force by the tightening of the nut 25. This completes the installation of the grip clamp 8 upon the polished rod 17.

Inspection of the drawing of FIG. 1 reveals that the resistance of the system exemplified by the surfaces 13 and 28 engaging opposite portions of the polished rod 17 has a lever arm of approximately the radius of the polished rod or more specifically the lever arm of the resistance is equal to the distnace from the fulcrum line 33 at the surface of the polished rod to the center of the polished rod. At the same time the lever arm of the applied force or effort of the system is equal to the distance from the fulcrum line 33 to the center line 35 of the clamp bolt 14 which in the examples shown is approximately three and two-tenths time as great as the radius of the polished rod 17 so that as an example if the force of the bolt and nut applied to push the leg portions 10' and 20' toward each other is equal to 10,000 lbs. the force applied by the surfaces 28 and 13 will be of the order of 32,000 lbs. as compared with the approximately 20,000 lbs. available in like circumstances with a polished rod clamp of prior design.

A second embodiment of the principles of this invention is shown in FIG. 4 wherein a grip clamp generally indicated at 38 is formed from a combination of a left-hand member 40 and a right-hand clamp member 50 provided with an interfitting tongue portion 46 on the left-hand clamp member 40 and a loop portion 42 on the right-hand clamp member 50 assembled in the same manner as that described for the embodiment of FIGS. 1, 2 and 3 with a fulcrum line at 43 approximately on the surface of thep olish rod 17 and analogous to the fulcrum line 33 of the first embodiment. The main difference between the first embodiment and that of FIG. 4 hereinafter referred to as the second embodiment is that the clamp members 40 and 50 are each formed of two separate pieces hinged together as by pins 47 and 48, respectively. The application of forces from a clamp bolt 44 to the clamp members 40 and 50 with the arcuate surfaces thereof being forced against the outer surfaces of the polished rod 17 follows exactly the same principles as those applied in the grip clamp 8 of the first embodiment with the attendant high mechanical advantage yielding high clamping force in entirely the same manner. The two piece construction of the members 40 and 50 respectively makes it easier to spread the members 40 and 50 apart for ease of installation or removal of the clamp 38 while at the same time the two piece construction of each member with the pins 47 and 48 as connecting members will probably make the clamp 38 more expensive to manufacture and somewhat more liable to failure than the simple one piece members 10 and 20 of the first embodiment.

A third embodiment of the principles of this invention as shown in FIG. 5, comprises a left-hand clamp member 55 incorporating a loop portion as at 56 interfitting with a tongue portion 57 of a hooked shaped right-hand clamp member 60 with a fulcrum line as at 58, again on the surface of the polished rod 17 forming the grip clamp 54 of the third embodiment. The clamp members 55 and 60 are probably more easily formed than clamp members 10 and 20 of the first embodiment but conversely are probably less rugged and more subject to failure than those of the first embodiment particularly where maximum forces are to be applied.

FIGS. 6 and 7 show the application of the principles of the invention in a clamp suited to installation on polished surfaces of polygonal cross section, for example a smooth square rod 66 (FIG. 7) or a rod of hexagonal cross section 67 (FIG. 6) wherein a grip clamp generally indicated at 61 is formed of interfitting members 62 and 64 left-hand and right-hand, respectively, having substantially planar facing surfaces in place of the arcuate surfaces 13 and 28 of the first embodiment. However, the fulcrum line as at 65 is still at the surface of the object being clamped and the high mechanical advantage is still present in this fourth embodiment as shown in FIGS. 6 and 7. It is of course possible that the grip clamp 61 might also be formed with arcuate surfaces or the grip clamps 8, 38 and 54 might be formed with flat surfaces to render these clamps interchangeable as regards the type of object to be gripped. Obviously means other than the bolt 14 can be employed for applying the clamping force (e.g. a spring, hydraulic or pneumatic cylinder, a cap screw) without departing from the principles of this invention.

Preferred embodiments of this invention having hereinbefore been described and shown it is to be realized that further variations in the structures applying the principles of this invention are to be expected and are envisioned.

What is claimed is:

1. In a two piece clamp structure in which the two members thereof pivot with relation to each other about an axis and form a through passageway therebetween for receiving an article to be clamped and which members are secured together at a given location with respect to said passageway the improvement comprising, locating said pivot axis essentially at the outer surface of the article being clamped in circumferential spaced relationship from said given location with reference to said passageway.

2. A clamp structure as defined in claim 1 in which one of said members has a free end thereof projecting through an opening in the other member with said free end forming said pivot axis in part.

3. A clamp structure as defined in claim 1 in which one of said members has a free end thereof projecting through an opening in the other member thereof with the extreme edge of said free end forming said pivot axis in part.

4. A clamp structure as defined in claim 1 in which one of said members forms two circumferentially spaced portions of said passageway.

5. A clamp structure as defined in claim 4 in which said circumferentially spaced portions are arcuately spaced from each other to permit such an article to be inserted therebetween.

6. A clamp structure as defined in claim 1 in which said pivot axis and said given location are on opposite sides of a diameter of a clamped article.

7. In a two piece clamp structure in which the two members thereof pivot with relation to each other about an axis and form a through passageway therebetween for receiving an article to be clamped and which members are secured together at a given location with respect to said passageway the improvement comprising, forming a pivot axis by said members along a straight line at the surface of such an article.

8. A clamp structure as defined in claim 7 in which the portions of said members forming said pivot axis comprise diverging surfaces extending outwardly from said bore.

9. A clamp structure as defined in claim 7 in which each of said two members is formed from two pivotably connected members.

10. In a two piece clamp structure in which the two members thereof pivot with relation to each other about an axis and form a through passageway therebetween for receiving an article to be clamped and which members are secured together at a given location with respect to said passageway the improvement comprising, each one of said members forming two opposed portions of said passageway which are alternatively arranged to circumferentially space the portions of each member from each other.

References Cited
UNITED STATES PATENTS

| | | |
|---|---|---|
| 427,195 | 5/1890 | Seymour. |
| 1,664,709 | 4/1928 | Severns et al. |
| 1,765,151 | 6/1930 | Hansen. |
| 1,856,330 | 5/1932 | Greene. |
| 2,216,309 | 10/1940 | Bissell. |
| 3,159,893 | 12/1964 | Langren. |

DONALD A. GRIFFIN, Primary Examiner